W. L. SHEPARD.
APPARATUS FOR PRODUCING FUEL AND GAS FROM PEAT.
APPLICATION FILED DEC. 11, 1908.
936,049.
Patented Oct. 5, 1909.
2 SHEETS—SHEET 1.
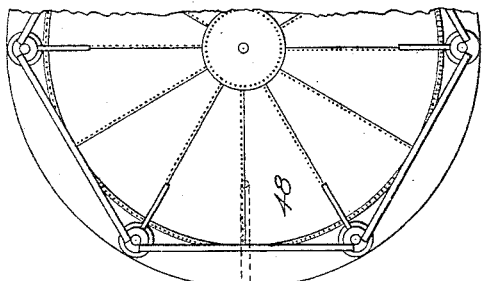
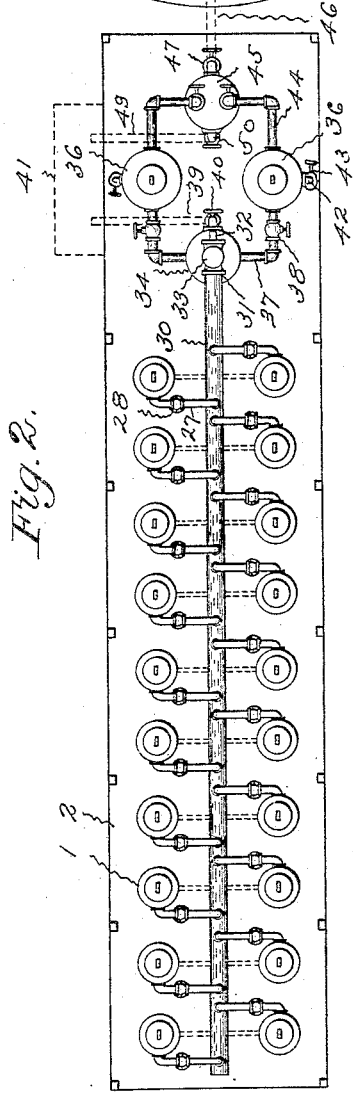
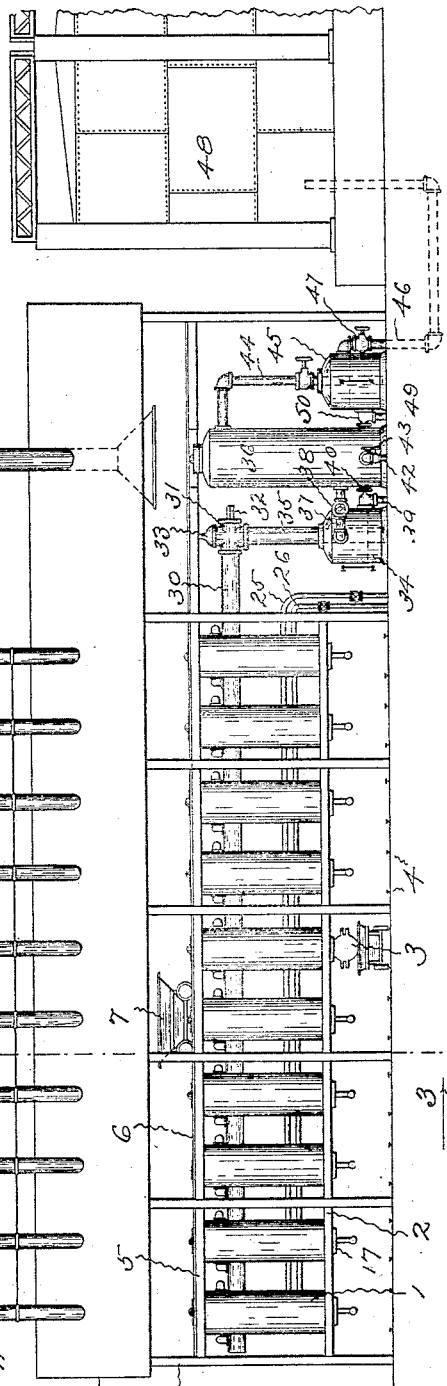
Witnesses.
Inventor
Wilbur L. Shepard
by Harry P. Williams
Attorney.

W. L. SHEPARD.
APPARATUS FOR PRODUCING FUEL AND GAS FROM PEAT.
APPLICATION FILED DEC. 11, 1908.

936,049.

Patented Oct. 5, 1909.
2 SHEETS—SHEET 2.

UNITED STATES PATENT OFFICE.

WILBUR L. SHEPARD, OF ELMWOOD, CONNECTICUT, ASSIGNOR OF ONE-HALF TO HORACE J. WICKHAM, OF MANCHESTER, CONNECTICUT.

APPARATUS FOR PRODUCING FUEL AND GAS FROM PEAT.

936,049.

Specification of Letters Patent.

Patented Oct. 5, 1909.

Application filed December 11, 1908. Serial No. 467,029.

*To all whom it may concern:*

Be it known that I, WILBUR L. SHEPARD, a citizen of the United States, residing at Elmwood, in the county of Hartford and State of Connecticut, have invented a new and useful Apparatus for Producing Fuel and Gas from Peat, of which the following is a specification.

This invention relates to an apparatus which is designed to produce fuel and gas from peat.

The object of the invention is to provide a comparatively simple apparatus by means of which cheap and efficient fuel, and good and pure gas can be continuously produced in an economical manner and with the employment of little labor, from ordinary peat, and the by-products saved.

The plant illustrated and described herein as one embodiment of the invention, and which is the preferred construction, on account of economy in labor necessary to handle it, has vertical retorts arranged in two parallel rows in a building. The object of the invention however, can be attained by arranging any desired number of either vertical, inclined or horizontal retorts, depending on the contemplated capacity or amount of output of the plant, in any other convenient relation to each other.

Figure 3:
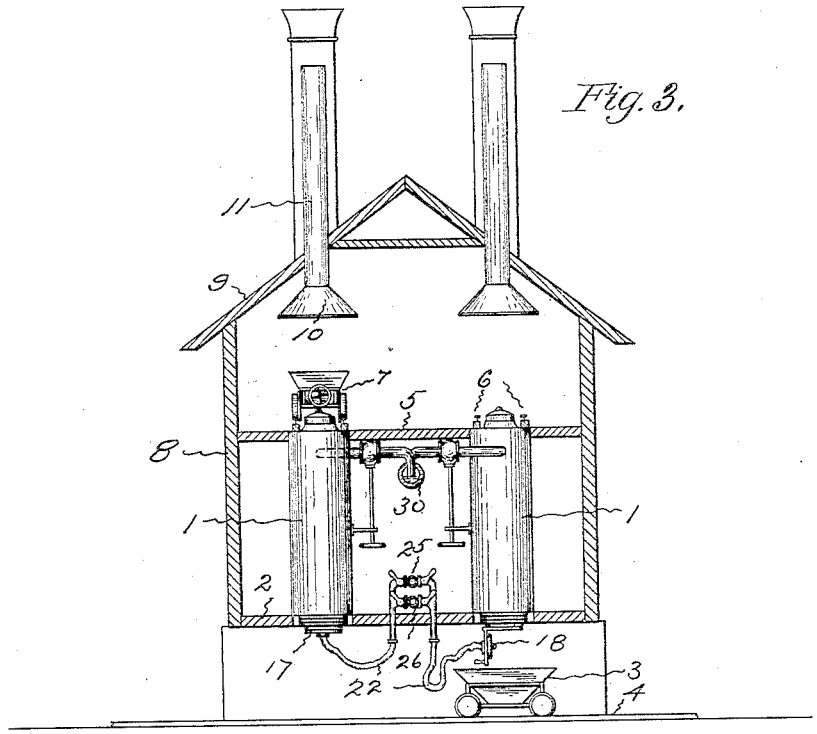
Figure 4:
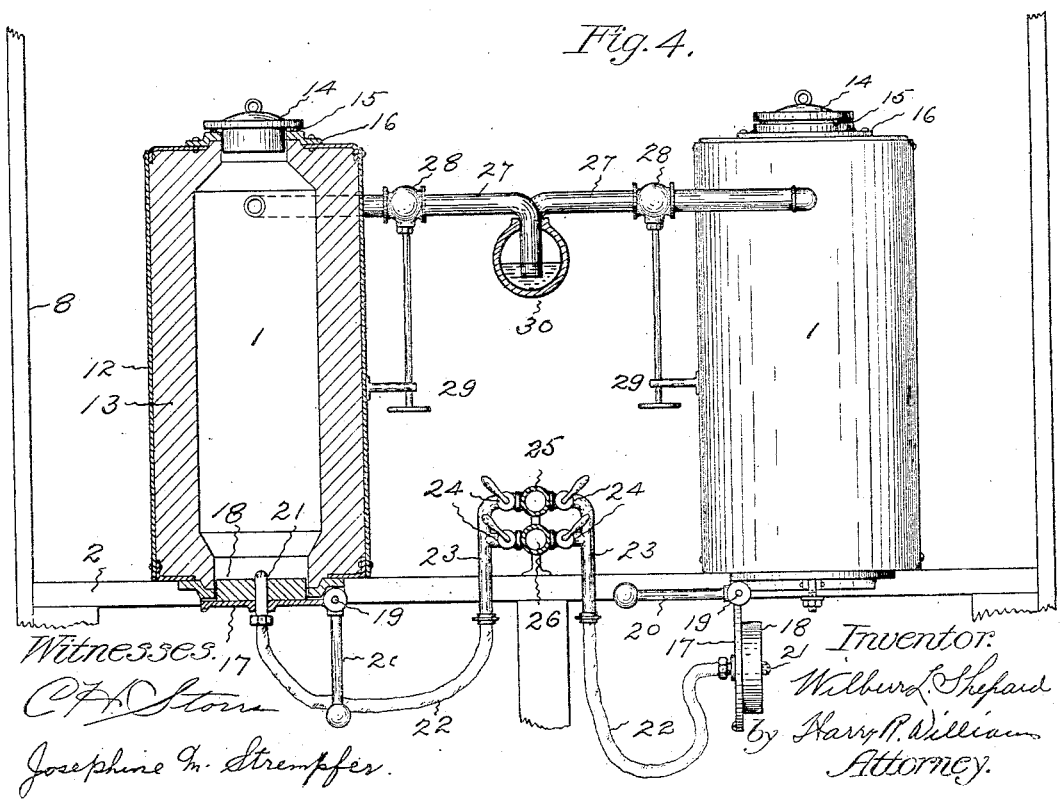

Figure 1 of the accompanying drawings shows a side elevation of a plant which embodies this invention, the walls of the building being cut away to expose the apparatus. Fig. 2 shows a plan of the apparatus illustrated in Fig. 1. Fig. 3 shows, on larger scale, a transverse section of the plant taken on the plane indicated by the dotted line 3—3, and looking in the direction indicated by the arrows, on Fig. 1. Fig. 4 shows a transverse section, on still larger scale, with one of the retorts cut centrally, and the other retort with its bottom open.

The retorts 1 which are shown as arranged in two rows on a suitably strong floor 2, are preferably located sufficiently above the ground level to permit cars 3 to pass beneath them on the transversely arranged tracks 4 in order to receive the fuel produced by the practice of this invention as it is discharged from the bottoms of the retorts. At about the level of the tops of the retorts is a floor 5 provided with longitudinally arranged tracks 6 upon which cars 7 may be rolled over the upper ends of the retorts for the purpose of conveniently charging the retorts with the peat to be treated in this plant. The walls 8 of the building which support these floors and the roof 9 resting upon these walls are preferably built of concrete and iron in order that the structure may have sufficient strength to support the apparatus and be fire proof. Hoods 10 and stacks 11 are located on the roof over the tops of the retorts to permit the ready outflow of gases and products of combustion which escape while the retorts are being heated before they are charged with peat. Each of these retorts is preferably built of an iron or steel shell 12 lined with brick or other fire-proof and heat non-conducting material 13. These linings are made thick so as to provide a large mass which will retain the great amount of heat necessary to carbonize the peat and liberate the desired gas. At the top of each retort is an opening in which is placed a cover 14. This cover is designed to rest upon a packing 15 placed on a flange 16 secured to the top of the shell, and it is desirably made of such weight that it will close the opening sufficiently tight to retain the gas under all normal conditions, but will, if an abnormal pressure is generated within the retort, lift and permit the escape of gas so as to relieve the pressure and prevent the apparatus from becoming destroyed by explosion. The opening at the bottom of each retort is closed by a metallic door 17 faced with a sufficient mass of brick or other fire resisting and heat non-conducting material 18 to support the charge of peat and protect the parts from heat. This door is preferably hinged at one side on a rod 19 and is provided with a downwardly extending bar 20 of such weight as to partially counterbalance the weight of the door and enable it to be opened and closed easily at the desired time.

In the apparatus shown, which is designed to utilize gas or oil for the purpose of heating the retorts, a burner 21 is arranged in each door. These burners are joined by a flexible connection, such as a hose 22, with a pipe 23. This pipe is connected by branches, provided with suitable cocks 24, with a gas or oil supply pipe 25 and a pipe 26 for supplying air under pressure or steam, which pipes, in the apparatus illustrated, extend longitudinally one above the other midway between the two rows of retorts. If the retorts are to be heated by gas the pipe 25 is connected with any convenient source of gas supply and the pipe 26 is connected with a receiver containing air under pressure. If oil is the fuel to be used for heating the retorts, the upper pipe may be connected with any source of oil supply and the lower pipe connected with a source of steam supply. By manipulating the cocks located in the firing fuel supply pipes to each retort, the proper mixture of gas and compressed air or of oil and steam is obtained for producing a hot combustion at the bottom of the retorts for giving them their preliminary heating. If it is not convenient or desirable to supply gas or oil to the burner for heating the retorts, coal, coke or wood may be placed in the retorts and burned. When the retorts are being heated, either by the combustion of gas, oil or other substance, the covers of the retorts are removed and the gases and products of combustion permitted to flow out and escape through the stacks in the roof above the retorts.

Leading from near the top of each retort is a pipe 27 provided with a valve 28 that can, by the handle 29, be conveniently opened when desired to permit the outflow of gas liberated from the peat, or closed to cut off the retort from the remainder of the system. These gas outlet pipes enter the top of and extend down a slight distance below the liquid in what is commonly known as a hydraulic main 30, that is preferably arranged to run centrally between the rows of retorts just below the upper floor.

The hydraulic main is connected with a fitting 31 which is provided with a cleaning plug 32 and a gas tight cap 33 so weighted that in case the gas should any time become ignited it will lift off and relieve the pressure, preventing explosion. The bottom of this fitting is connected with a gas washer and by-product separator 34, by a pipe 35 which enters the washer at the top and extends downwardly a short distance beneath the surface of a body of water contained therein. Extending from each side, near the top of the washer to two super-heaters 36 of ordinary construction, are pipes 37 containing valves 38. The gas which flows from the hydraulic main rises through the water and passes through these connections into the super-heaters. The cocks in the connections between the washer and the super-heaters are manipulated as desired, so that first one and then the other super-heater can be used, or in other words, so that the current of gas can be directed from the washer first to one and then to the other of the super-heaters in order that one super-heater can be heated while the other is being used to super-heat the gas and fix it.

A pipe 39, with a valve 40 to control it, leads from the washer at about the level of the water therein, to a by-product tank 41. Oils and other matter heavier than gas and lighter than water, which pass with the gas from the hydraulic main into the washer are separated from the gas and rise to the surface of the water and are drawn off through this pipe to the by-product tank from which, whenever desired, these substances are removed and distilled into the several by-products of which they are composed.

Leading into the bottom of each of the gas super-heaters, which are of common construction, from any supply of gas or oil, is a pipe 42, controlled by a suitable valve 43, which connects with an ordinary burner, for supplying fuel for the purpose of raising the temperature in the super-heaters to the necessary degree in the usual manner. In these heaters the gas which flows from the washers is super-heated and permanently fixed. From near the top of each of these super-heaters pipes 44 lead to a washer 45. The inlet pipes to this washer extend beneath the surface of the water therein, as in the case of the washer previously described, and the outlet pipe 46 containing a valve 47 leads from above the water to a gasometer 48 of common construction. An outlet pipe 49 with a cock 50 leads from about the level of the water in this washer to the by-product tank so that should there be any foreign substances or impurities in the gas which flows from the super-heaters, it is collected in this washer and can be drawn off to the by-product tank, leaving the gas which flows to the gasometer pure.

In operating this plant the cover of a retort is first removed, then gas and compressed air, or oil and steam turned on and lighted at the burner in the bottom of the retort. The supply of this firing fuel is regulated by the cocks in the admission pipes and is kept burning in the interior of the retort until the lining is heated to a very high temperature, almost white hot. When the interior of the retort is sufficiently heated the supply of firing fuel is shut off and a car containing peat that is practically dry is run over the open top and a charge of peat dropped into the heated retort. As soon as the charge is deposited in the retort the cover is put in place so as to seal the retort chamber gas tight and at the same time the valve in the gas outlet pipe leading from the retort to the hydraulic main is opened in order to permit the gas, which is liberated from the peat by the great heat of the walls of the retort, to flow into the hydraulic main. The gas then flows through the main, which provides the first water seal and accomplishes the first washing of the gas, into the washer and first by-product separator, where the heavier than gas but lighter than water substances are removed from the gas, which rises from the water and flows, according to the adjustment of the valves, to either one or the other of the super-heaters wherein the gas is super-heated and fixed in the usual manner. The super-heated and fixed gas then flows to the second washer which tends to further purify the gas and remove all foreign substances, which are collected in the by-product tank. The gas, after passing through the second washer flows into the gasometer where it is stored for commercial purposes. The gas which is used to heat the retorts may be drawn from the gasometer fed by the plant, or from any other convenient source of supply. Each retort is always cut off from the others by the water seal of the hydraulic main, and each can be positively cut off by the valve in its outlet pipe so there is no possibility of a fireback during operation. The water of the hydraulic main also assists in removing impurities from the gas as well as eliminating any possibility of flame from the retorts reaching the gasometer. The action of the intense heat thrown off by the walls of the retort while the gas is being liberated carbonizes the peat and converts it into masses of charcoal or coke, hard or soft, according to the length of time the peat remains in the retort. If the peat is left in the retort a sufficient length of time a large amount of gas is liberated and the peat becomes very hard, in which condition it is a desirable fuel for many purposes. After the peat has been converted to the desired condition and all of the gas has been collected, the bottom of the retort is opened and the charge dumped into a receptacle of the car which is rolled beneath the retort. This car is quickly closed and the heated charge of carbonized peat sealed therein and kept in that condition until cold so as to prevent its combustion by contact with the oxygen of the air while it is hot. As soon as a charge of carbonized peat is withdrawn the lower door is instantly closed, and as all of the heat is not withdrawn from the walls of the retort it requires but little if any further heating, to carbonize the next charge placed therein.

With this plant the operation of carbonizing peat for converting it into fuel and obtaining the gas liberated therefrom is continuous, for charges of peat can be deposited in the heated retorts one after the other in succession as fast as they are emptied, and the carbonizing and gas extraction is carried on in some of the retorts while others are being heated. As soon as a carbonized charge is drawn from the bottom of a retort by laborers which roll the cars below from one retort to the next in succession, laborers overhead immediately roll the cars above and fill the retorts which have been emptied. Not only is the operation of this apparatus continuous and can the retorts be charged and discharged rapidly with a minimum amount of labor, but each retort is practically a unit which can be cut off entirely from the others whenever desired for the purpose of heating or for re-lining or making any required repairs. Such repairs can be carried on without in any way interfering with the operation of the remainder of the plant, as the valves and cocks which are provided permit the necessary isolation of any retort.

With this apparatus it is unnecessary to disconnect any of the parts while a charge is being placed in or removed from the retorts for the bottoms can be opened without disconnecting any pipes, and in case of any igniting of gas in any retort, the cover of that retort is lifted by the excess pressure so as to prevent any violent explosion and damage to the apparatus.

The invention claimed is:

1. A retort containing a chamber designed to hold peat, a cover loosely sealing the upper end of the retort, a door closing the lower end of the retort, a burner carried by the door and adapted to supply fuel for heating the retort internally before the peat is placed therein, and means for conducting away the gas liberated from the peat in the internally heated retort.

2. A retort consisting of a shell provided with a lining of fire resisting material, a cover loosely sealing the top of the retort, a door hinged to the lower end of the retort, a burner carried by said door, and an outlet pipe leading from the upper portion of the retort.

3. An apparatus for producing fuel and gas from peat having a number of retorts, means for heating the retorts internally before the peat is placed therein, a hydraulic main, gas pipes leading from the upper portions of the retorts to the main, a washer connected with the main, a super-heater connected with the washer, and connections leading from the super-heater to a gas storage tank.

4. An apparatus for producing fuel and gas from peat having a plural number of retorts, means for heating the retorts internally before the peat is placed therein, a hydraulic main, gas pipes leading from the upper portions of the retorts to the main, a washer connected with the main, super-heaters, pipes leading from the washer to the super-heaters, valves arranged in said pipes so that either super-heater can be utilized without using the other, and pipes leading from the super-heaters to a gas storage tank.

5. An apparatus for producing fuel and gas from peat having a plural number of retorts, means for heating the retorts internally before the peat is placed therein, a hydraulic main, gas pipes leading from the upper portions of the retorts to the hydraulic main, and valves arranged in the said pipes whereby each retort can be isolated from the hydraulic main.

6. An apparatus for producing fuel and gas from peat having a plural number of retorts, means for heating the retorts internally before the peat is placed therein, a hydraulic main, pipes leading from the upper portions of the retorts to the main, a washer connected with the main, a super-heater connected with the washer, a second washer connected with the super-heater, and pipes leading from the second washer to a gas storage tank.

7. An apparatus for producing fuel and gas from peat having a plural number of retorts, means for heating the retorts internally before the peat is placed therein, a hydraulic main, pipes leading from the upper portions of the retorts to the main, a washer connected with the main, two super-heaters connected with the washer, a second washer connected with the two super-heaters, and pipes leading from the second washer to a gas storage tank.

8. An apparatus for producing fuel and gas from peat having parallel rows of retorts, means for heating the retorts internally before the peat is placed therein, a hydraulic main extending between and parallel with said rows of retorts, pipes connecting the upper portions of the retorts with the main, and valves arranged in said pipes whereby each retort can be isolated from the others.

9. An apparatus for producing fuel and gas from peat having a plural number of retorts arranged in parallel rows, means for heating the retorts internally before peat is placed therein, gas and air pipes arranged between and parallel with said retorts for supplying firing fuel thereto, a hydraulic main extending between and parallel with the retorts, pipes connecting the retorts with the main, and valves located in said pipes whereby each retort can be isolated from the others.

10. An apparatus for producing fuel and gas from peat having a plural number of retorts, means for heating the retorts internally before the peat is placed therein, a hydraulic main, pipes leading from the upper portions of the retorts to the main, a washer connected with the main, a super-heater connected with the washer, a by-product tank, and a pipe connecting the washer with the by-product tank.

11. An apparatus for producing fuel and gas from peat having a plural number of retorts, means for heating the retorts internally before the peat is placed therein, a hydraulic main, pipes leading from the upper sections of the retorts to the main, a washer connected with the main, a super-heater connected with the washer, a second washer connected with the super-heater, a pipe leading from the second washer to a gas storage tank, a by-product tank and pipes leading from the washers to the by-product tank.

12. An apparatus for producing fuel and gas from peat having a plural number of retorts, arranged in parallel rows, said retorts having their bottoms closed by hinged doors, burners carried by said doors, air and gas pipes arranged between the rows of retorts, flexible connections between the said pipes and the burners, a hydraulic main arranged between and parallel with the rows of retorts, and pipes leading from the upper portions of the retorts to the main.

13. A plant for producing fuel and gas from peat having retorts arranged in parallel rows, said retorts having removable covers at the top and hinged doors at the bottom, means for heating the retorts internally before the peat is placed therein, tracks extending above the covers whereby cars containing peat may be rolled over the tops of the retorts, tracks arranged below the retorts whereby cars may be rolled below the doors at the bottoms of the retorts, a main, pipes leading from the upper portions of the retorts to the main, a washer connected with the main, super-heaters connected with the washer, a second washer connected with the super-heaters, pipes leading from the second washer to a gas storage tank, and pipes leading from the washer to a by-product tank.

WILBUR L. SHEPARD.

Witnesses:
H. R. WILLIAMS,
JOSEPHINE M. STREMPFER.